United States Patent
Thom et al.

(10) Patent No.: US 11,328,050 B2
(45) Date of Patent: May 10, 2022

(54) MEASURED EXECUTION OF TRUSTED AGENTS IN A RESOURCE CONSTRAINED ENVIRONMENT WITH PROOF OF WORK

(71) Applicant: Microsoft Technology Licensing, LLC, Redmond, WA (US)

(72) Inventors: Stefan Thom, Snohomish, WA (US); Brian Clifford Telfer, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 536 days.

(21) Appl. No.: 16/291,827

(22) Filed: Mar. 4, 2019

(65) Prior Publication Data

US 2020/0285731 A1   Sep. 10, 2020

(51) Int. Cl.
| | | |
|---|---|---|
| *G06F 21/44* | (2013.01) | |
| *G06F 21/57* | (2013.01) | |
| *H04L 9/32* | (2006.01) | |

(52) U.S. Cl.
CPC .............. *G06F 21/44* (2013.01); *G06F 21/57* (2013.01); *H04L 9/3234* (2013.01); *H04L 9/3236* (2013.01)

(58) Field of Classification Search
CPC .......... G06F 21/44; G06F 21/57; G06F 21/31; H04L 9/3234; H04L 9/3236
See application file for complete search history.

(56) References Cited

U.S. PATENT DOCUMENTS

| | | |
|---|---|---|
| 9,202,038 B1 | 12/2015 | Allen |
| 9,807,092 B1 | 10/2017 | Gutzmann |
| 2009/0300348 A1* | 12/2009 | Aciicmez ................ H04L 63/08 713/156 |
| 2017/0180386 A1 | 6/2017 | Dewan et al. |
| 2017/0244709 A1 | 8/2017 | Jhingran et al. |
| 2018/0089465 A1* | 3/2018 | Winstrom ............... H04L 51/12 |

OTHER PUBLICATIONS

Drew Dean, et al., Using Client Puzzles to Protect TLS, Aug. 13-17, 2001, Proceedings of the 10th USENIX Security Symposium, USENIX Association, pp. 1-9. (Year: 2001).*
Dean, Drew, "Using Client Puzzles to Protect TLS", In Proceedings of the 10th USENIX Security Symposium, Aug. 13, 2001, 8 Pages.
"International Search Report and Written Opinion Issued in PCT Application No. PCT/US20/019570", dated May 19, 2020, 11 Pages.

* cited by examiner

*Primary Examiner* — Nelson S. Giddins
(74) *Attorney, Agent, or Firm* — Mark K. Young; Mayer & Williams, PC

(57) ABSTRACT

Trusted agents operating within a trusted execution environment (TEE) of a client computing device are configured with complex computational puzzles (e.g., hash functions or other proof of work puzzles) for a remote service to solve before the trusted agent executes an operation. The trusted agent may have a policy that the puzzle is associated with, in which the policy defines a statistically defined time period over which puzzles are solved. The statistically defined time period is effectuated through parameters which control a complexity of the puzzle. Malware or bad actors that attempt to misuse the trusted agent are throttled until the remote service solves the puzzle, which is configured with a level of complexity that takes the statistically defined time period.

19 Claims, 13 Drawing Sheets

1000

1100

1200

US 11,328,050 B2

MEASURED EXECUTION OF TRUSTED AGENTS IN A RESOURCE CONSTRAINED ENVIRONMENT WITH PROOF OF WORK

BACKGROUND

Client computing devices, such as laptop computers, personal computers, and Internet of Things (IoT)-enabled devices with sensors and network connectivity to report data, can be configured with trusted execution environments (TEEs) with one or more trusted agents that perform various operations. Trusted agents can be misused by untrusted parties through malware and other techniques, in which the untrusted parties can repeatedly utilize the operations provided by the trusted agents. For example, if a trusted agent is responsible for providing a logon or authorization token, then the malware may persistently obtain or use up tokens for its own use or pass them to other unauthorized parties.

SUMMARY

Trusted agents operating within a trusted execution environment (TEE) of a client computing device are configured with complex computational puzzles, or challenges (e.g., hash functions or other proof of work puzzles) for a remote service to solve before the trusted agent executes an operation. Tying client computing device operations to resolutions of a puzzle can throttle the number of operations the client computing device can perform which thereby prevents a bad actor from maliciously racking up usage. The complexity of the puzzle, and thereby the statistically defined time period it takes to solve the puzzle, for trusted agents is adjustable using parameters associated with the puzzle. The utilization of the complex computational puzzles provides the benefit of safeguarding the resources of the trusted agent, the processor, and other system resources which are shared among the trusted agents and applications operating on the client computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
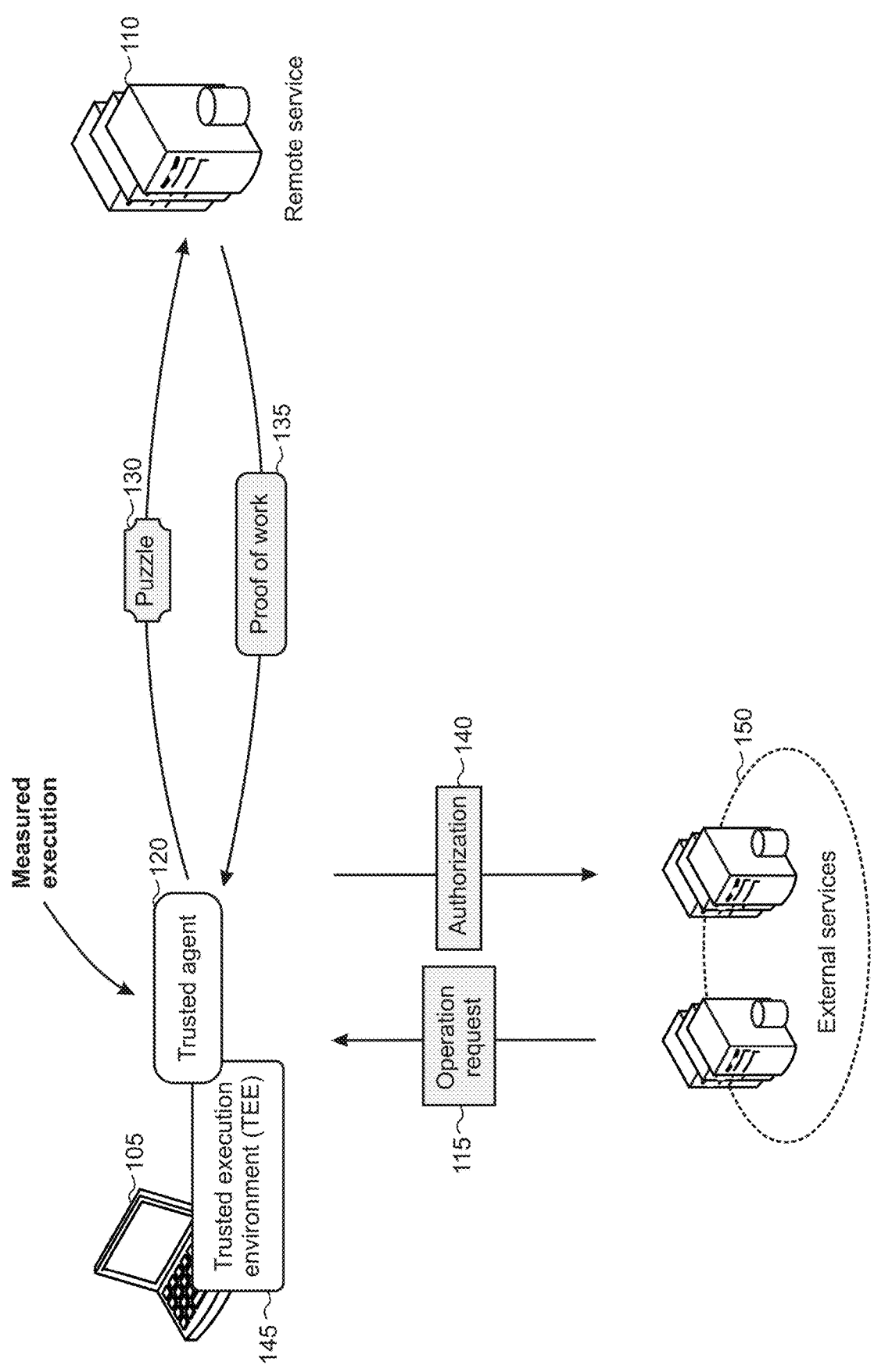
FIG. 1 shows an illustrative environment in which a client computing device's trusted agent provides authorization to an operation request upon receiving proof of work from a remote service.

A client computing device utilizes and provides complex computational puzzles, or challenges (e.g., hash functions or other proof of work puzzles), for a remote service to solve before the trusted agent within the trusted execution environment (TEE) of the client computing device can perform an operation. The remote service may be the service asking for the trusted agent's services (e.g., an authorization token) or may be a separate trusted service utilized by the client computing device. The trusted agent provides the puzzle to the remote service for solving to accommodate the resource constrained environment typically associated with TEEs, such as Internet of Things (IoT)-enabled devices configured with sensors and network connectivity to generate and transmit telemetry data. Displacing resolution of the puzzles to the remote service can save processor usage, memory, and the like within the TEE of the client computing device. The TEE does not waste resources solving the puzzle or storing token usage information, but rather can verify that the remote service solved the puzzle by verifying the proof of work. Verifying the proof of work uses less resources than the function of solving the puzzle, proves to the client computing device that the puzzle was solved, and triggers operation of the trusted agent.

The trusted agent is configured with a policy that includes a statistically defined time period for resolution of the puzzle and parameters for the puzzle. The statistically defined time period can be a time period defined between upper and lower boundaries (e.g., 10-15 minutes) or may be an average time by which the puzzle is expected to be solved (e.g., 10 minutes, one hour, etc.). The parameters can effectuate the statistically defined time period that is defined within the policy by setting a level of complexity for the puzzle. The level of complexity can effectively increase or decrease the duration of time it takes for the remote service to solve the puzzle. Operations are throttled by the remote service's ability to solve the puzzle provided to it by the trusted agent since each operation of the trusted agent is tied to the resolution of a puzzle. Throttling operations according to a set time table for the trusted agent can safeguard against malware or a bad actor attempting to persistently access or rack up the trusted agent's operations. The utilization of the puzzles and verifying the proof of work for the puzzles enables a true metering of the trusted agent's usage. While the remote service may continuously attempt to solve puzzles from the trusted agent in advance, the remote service will ultimately be constrained by the statistical time period defined by the policy. For example, if the remote service solves a puzzle in five minutes that statistically takes seven minutes, then the next puzzle may statistically be configured to take ten minutes to solve.

The policy is configured to regulate usage of the respective trusted agent's operations (e.g., token usage). The policy may vary for each trusted agent within the TEE. One trusted agent may have a policy with parameters for a puzzle that statistically takes ten minutes to solve, and another trusted agent may have a policy with parameters for a puzzle that statistically takes five minutes to solve.

The puzzles may be tracked to verify that they are solved by the expiration of a time period and the proof of work is not stale. The TEE of the client computing device knows that a respective puzzle can be solved by the remote service within a certain period of time, so the client computing device may set a maximum time by which the remote service responds with a proof of work. If the trusted agent does not receive the remote service's proof of work for the puzzle by the expiration of the set time, then the trusted agent may disregard any future proof of work. A proof of work received after expiration of the time period may indicate that a bad actor is attempting to solve the puzzle.

The policy can be periodically re-evaluated to address potential issues that are experienced. For example, a remote policy service may be utilized to store records for the trusted agents to evaluate the results of the remote service's resolution of the puzzles. If the policy service determines that some of a respective trusted agent's puzzles are statistically solved too quickly, then the policy can be re-configured with a new puzzle having a different complexity to throttle operations for the trusted agent according to the statistically defined time period. Additionally, puzzles solved too quickly may indicate the possibility that bad actors are attempting to infiltrate the system. The puzzles can be re-evaluated daily, weekly, upon the detection of an issue, or by another metric.

Utilizing computational proof of work puzzles to throttle trusted agent operations can enhance the security for TEEs, computing devices generally, and operations which have limited resources. Scenarios in which bad actors or malware are attempting to run up uses of a trusted agent can be kept at bay by implementing proof of work puzzles configured with parameters that effectuate a statistically defined time period for the trusted agent's operations. This provides the benefit of safeguarding the resources of the trusted agent, the processor, and other system resources which are shared among the trusted agents and applications operating on the client computing device. Throttling operations enables an administrator to operate trusted agents according to ordinary and expected use while inhibiting malicious attacks.

Turning now to the drawings, FIG. 1 shows an illustrative environment in which a trusted agent 120 associated with a client computing device 105 is subject to measured executions before performing an operation. An external service 150 initiates an operation request 115 to the trusted agent 120 operating within a trusted execution environment 145 of the client computing device. While the execution of the operation shows communicating with the external service, in other embodiments the operation may be triggered locally by the client computing device. The trusted agent 120 is throttled from executing the requested operation until a remote service 110 solves a computational puzzle 130, or challenge, and provides verifiable proof of work 135 (e.g., an answer) to the trusted agent. The trusted agent authorizes and executes the operation (e.g., provides an authorization token) upon verifying the proof of work, as illustratively shown by numeral 140.

Figure 2:
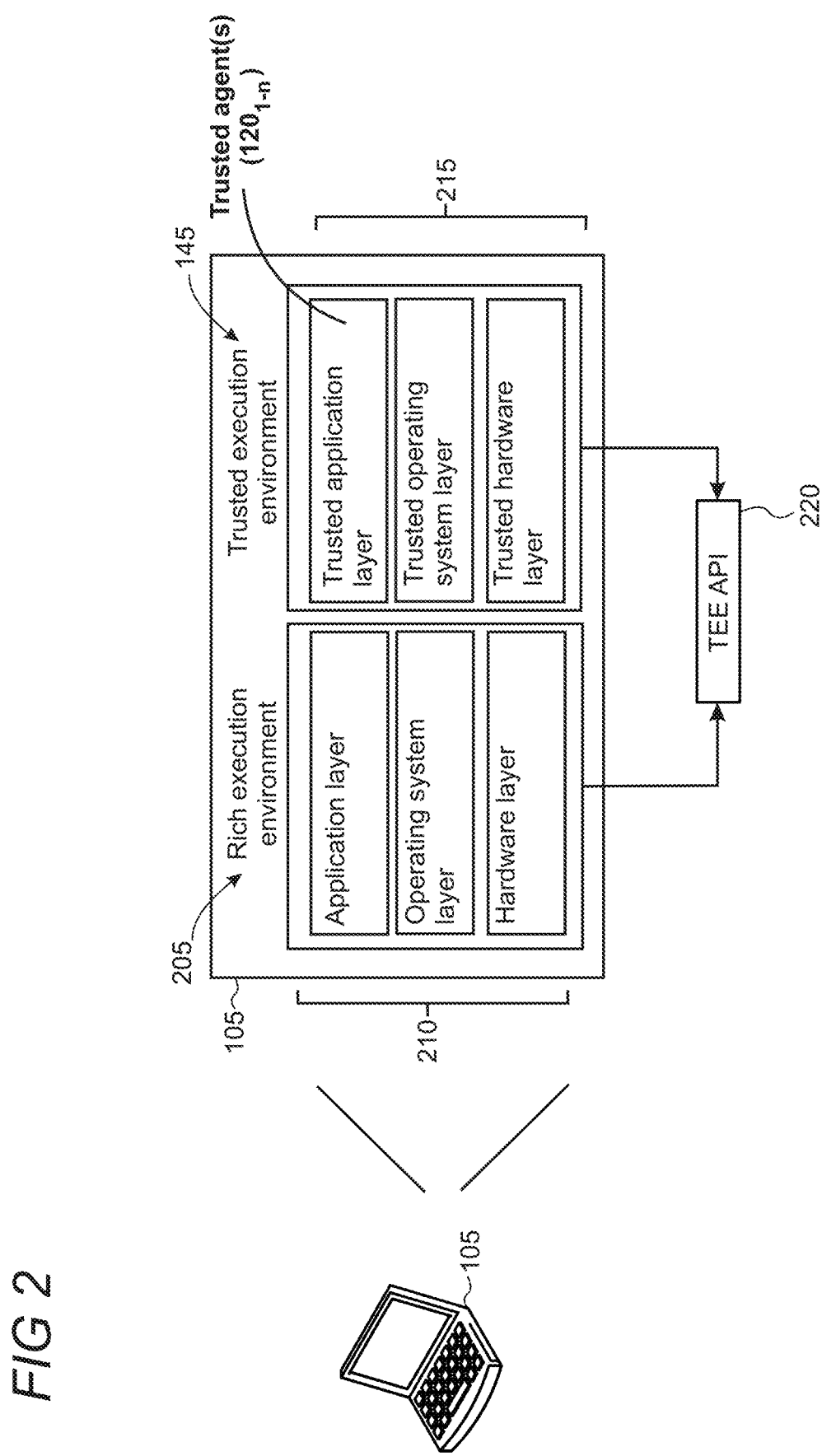
FIG. 2 shows an illustrative architecture of the client computing device configured with a rich execution environment (REE) and a trusted execution environment (TEE)

FIG. 2 shows an illustrative architecture of the client computing device 105 having a rich execution environment (REE) 205 running parallel to a trusted execution environment (TEE) 145. The REE may face the public and thereby be subjected to additional exposure and security risks. In contrast, the TEE may operate securely in isolation from the REE to perform operations that are of a more sensitive nature. Such sensitive operations can include the handling of confidential personal information, banking data, or providing access or authorization tokens to access a remote service or account.

As illustratively shown in FIG. 2, the REE and the TEE have conventional computing configurations to operate. In simplified form, the REE and TEE each include application, operating system, and hardware layers (collectively represented by numerals 210 and 215), although the TEE is isolated and the hardware and software therein are considered trusted. The TEE and REEs can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized (e.g., such that the TEE can be enforced using hardware so that malware that is attempted to be injected into the TEE via a buffer overrun cannot be executed by the secure processor), and any data inside the TEE cannot be read by code outside the TEE.

The application layers support one or more trusted agents 120 and applications that are executable by the operating system. The public facing application layer can support applications such as a browser, messaging applications, and the like, whereas the application layer in the TEE can support trusted operations. Trusted agents can perform various functions and operations local to the client computing device or can interoperate with external services.

A trusted agent can secure and provide an authorization or access token for the client computing device to log on to an account supported by a remote service, or access solutions provided by the remote service. An Internet of Things (IoT)-enabled client computing device (e.g., home appliances such as thermostats and refrigerators, industrial machinery such as cranes and excavators, etc.) can use the authorization token from the trusted agent to periodically access an IoT hub which provides specific solutions to the IoT device. IoT solutions can include software that is configured to support and interoperate with particular IoT device functionalities, such as artificial intelligence and machine learning algorithms and processes, analytic tools, automated operations, and data storage, among other solutions. Utilizing trusted agents inside the TEE to provide access tokens can facilitate trusted authorization procedures so that unauthorized users cannot access or use IoT solutions or a trusted agent's operations.

The operating system layers can manage system operations in which the hardware and application layers operate. In the REE, the operating system (OS) can include Windows®, whereas the TEE can run a secure OS which runs parallel to the public OS. The OS layers can each support a TEE application programming interface (API) 220 which provides the interoperability of the two environments. That is, a client TEE API in the REE can be used to commence a session with the TEE and thereby allow a trusted agent 120 inside the TEE to execute an operation.

The hardware layers support processors and memory, as depicted in FIG. 2. Although the REE and TEE are illustratively shown as operating distinctly from each other, the various hardware components can be partitioned such that portions of the hardware are dedicated for only public operations, and portions of the hardware are dedicated for only trusted operations. This partitioning of the components and system provides the secure isolation offered by the TEE.

Figure 3:
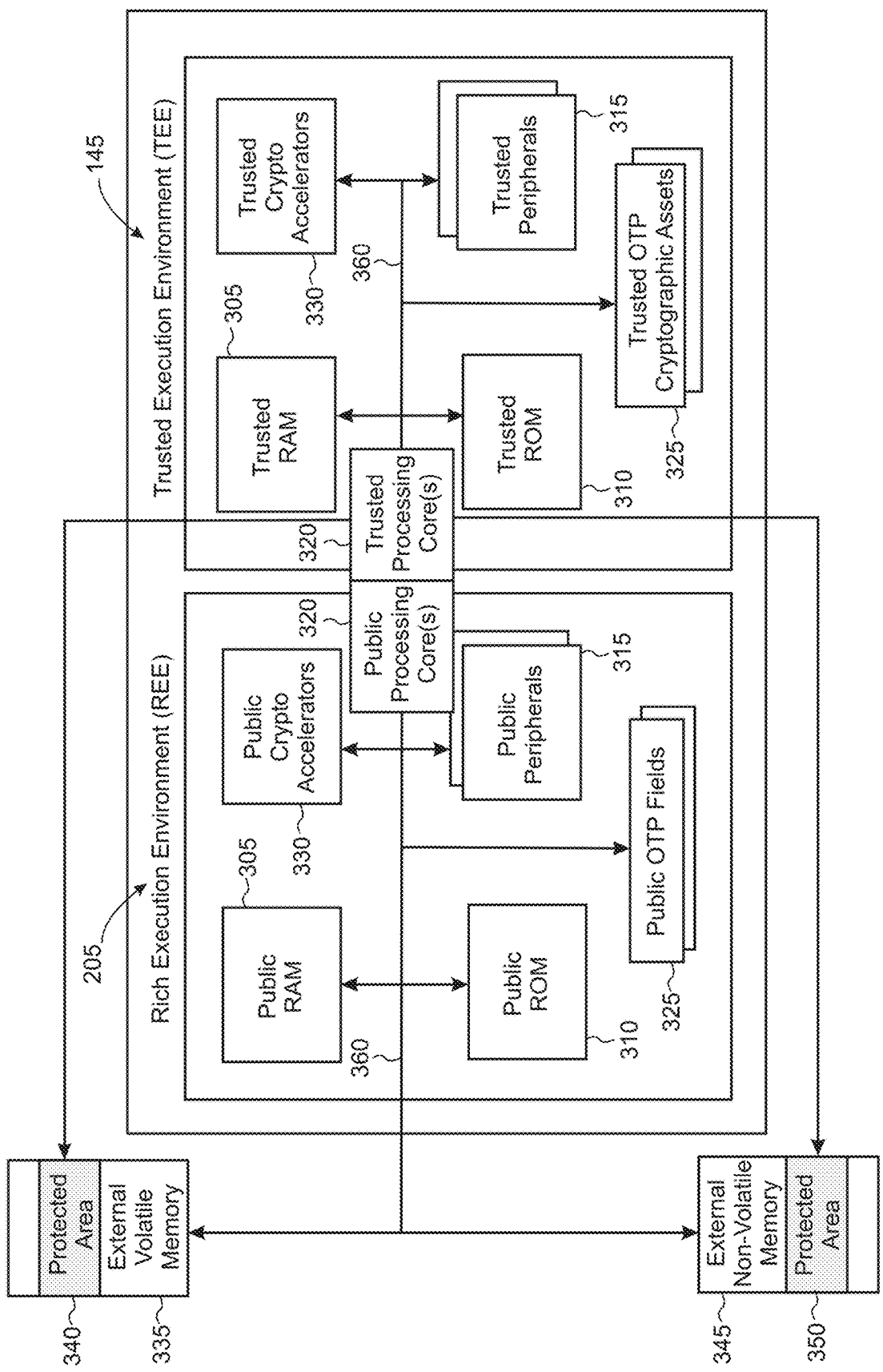
FIG. 3 shows an illustrative hardware architecture of the rich execution environment and the trusted execution environment.

FIG. 3 shows exemplary hardware of the computing device 105, which utilizes the REE 205 and TEE 145. As shown, the hardware components can be partitioned to isolate the TEE from the REE. The REE and TEE each include similar components which operate distinctly from the other environment. As illustratively shown, the various components include random access memory 305, read-only memory 310, peripherals 315 (e.g., input/output devices), processing core(s) 320, one-time password (OTP) fields 325, crypto accelerators 330, and a bus 360 to communicate. In one exemplary embodiment, the REE can utilize external volatile memory 335 and external non-volatile memory 345, and a portion of the memories can have a protected area dedicated exclusively for the TEE, as representatively illustrated by numerals 340 and 350. The diagrams illustrated in FIGS. 2 and 3 are illustrative only, and other configurations that satisfy the secure environment offered by the TEE are also possible.

Figure 4:
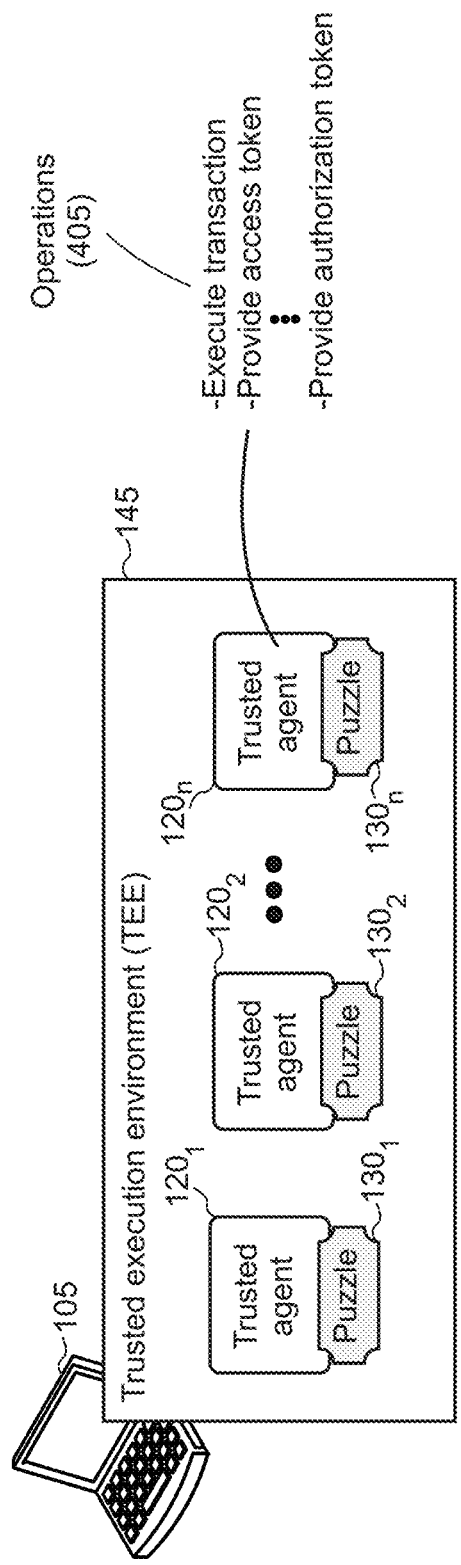
FIG. 4 shows an illustrative diagram in which distinct and unique puzzles are associated with each trusted agent.

FIG. 4 shows an illustrative environment in which the client computing device's TEE 145 is configured with multiple trusted agents 120. Each trusted agent may be configured to execute discrete operations 405, including interoperating with other applications or external services, executing transactions, providing access or authorization tokens, or performing other functions. For example, trusted agents may be used to facilitate access to different remote services (e.g., IoT solutions, account services for a laptop computer, etc.) by providing access or authorization tokens secured by the respective trusted agent.

Figure 5:
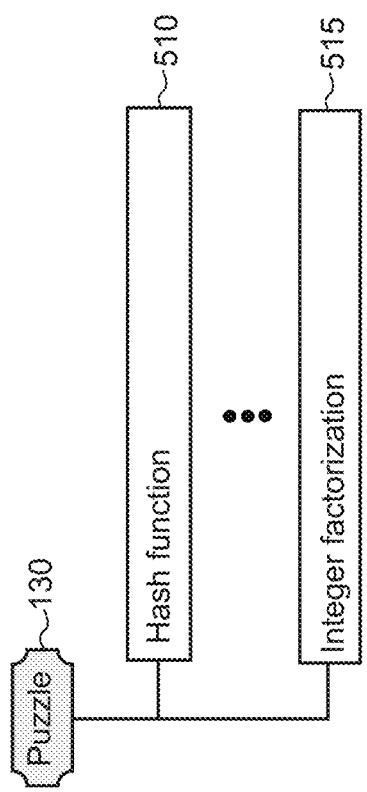
FIG. 5 shows an illustrative taxonomy of computational puzzles.

Each computational puzzle 130 may be unique to the trusted agent, including the type and configuration of the puzzle, and the policy associated with the puzzle as discussed below. FIG. 5 shows an illustrative and non-exhaustive taxonomy of computational puzzles 130 that may be implemented by a given trusted agent 120, including a hash function 510 and integer factorization 515.

Figure 6:
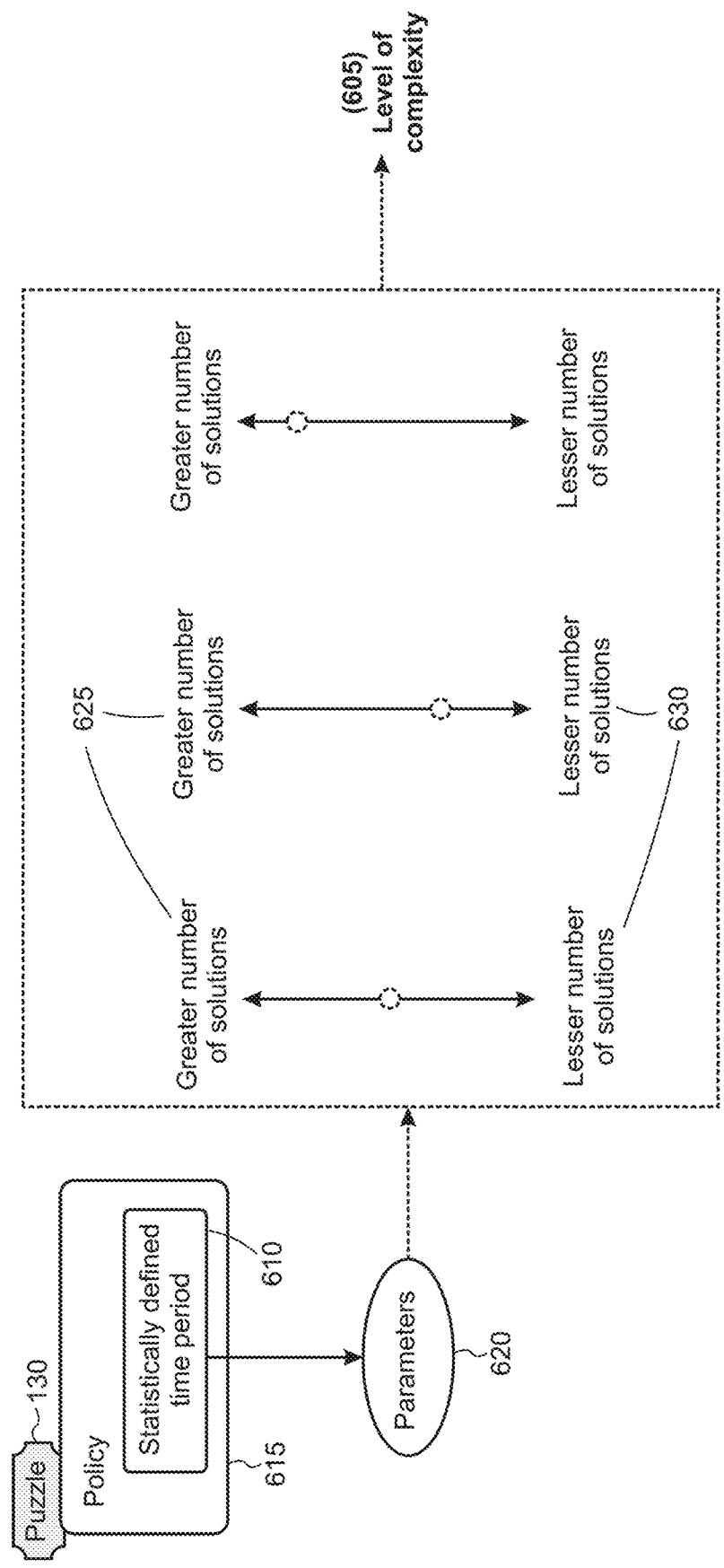
FIG. 6 shows an illustrative environment in which the parameters for a puzzle can vary based on the statistically defined time period in the policy.

FIG. 6 shows an illustrative diagram in which the level of complexity 605 of puzzles 130 may be controlled and utilized to effectuate a statistically defined time period 610 for puzzle resolution. Defined policies for respective puzzles may be unique to the trusted agent based on the trusted agent's operations or uses. Each puzzle may have a set policy 615 that defines the statistically defined time period (e.g., an average expected time) over which puzzles may be solved to throttle trusted agent operations. The statistically defined time period can be a time period defined between upper and lower boundaries (e.g., 10-15 minutes) or may be an average time by which the puzzle is expected to be solved (e.g., 10 minutes, one hour, etc.).

Parameters 620 for the puzzles can be used to configure the complexity of the puzzle and thereby adjust the statistically defined time period for resolution. For example, a cryptographic hash function using SHA-256 may be more difficult depending on the number of possible solutions (or nonce values) that the computer can check to identify the target hash. In an exemplary embodiment, the puzzle may be configured such that there are one million possible solutions to identify the target hash using SHA-256 (e.g., from X0 to X1,000,000). The computer may try each possible solution (e.g., X0, X1, X2, etc.) until a match is identified with the target hash.

Increasing or decreasing the difficulty of the hash puzzle may be respectively facilitated by increasing the number of possible solutions (e.g., to 100 million possible solutions) or decreasing the number of possible solutions (e.g., to 1,000 possible solutions). FIG. 6 shows three examples, depicted in sliding scale form, in which the parameters for the puzzle can be configured to prescribe the level of complexity 605 and thereby effectuate the statistically defined time period 610 set within the policy 615. Each example includes a varied placement of the puzzle's level of complexity relative to the greater number of solutions 625 and the lesser number of solutions 630.

The parameters and associated level of complexity are dependent on the statistically defined time period within the policy. Increasing a policy's defined time period for resolution can be facilitated by increasing the number of possible solutions for the puzzle, and decreasing a policy's defined time period for resolution can be facilitated by decreasing the number of possible solutions for the puzzle. While the amount of time to solve different puzzles may vary, the overall time period over which the remote service solves multiple puzzles may average to the statistically defined time period within the policy. For example, a computer that guesses the value for the target hash earlier than the statistically defined time period for one puzzle may exceed the statistically defined time period to solve a subsequent puzzle, thereby comporting with the policy.

Referring back to FIG. 1, upon receiving an operation request 115, the trusted agent transmits a puzzle 130 to a remote service for resolution. The operation request may come from an external service, a local application in the REE or TEE of the client computing device, or other source. The amount of time it takes for the remote service to solve the puzzle may depend on the complexity of the puzzle which is dependent on the statistically defined time period prescribed by the policy (FIG. 6). The remote service transmits the proof of work 135 to the trusted agent for verification upon solving the puzzle. Verification of proof of work is relatively easier because, for hash functions, the trusted agent checks that the output hash from the proof of work value corresponds with the target hash. The utilization of computational puzzles and proof of work prevents a single bad actor or malware from persistently using all of a trusted agent's resources and enables a user time to identify the problem.

Figure 7:
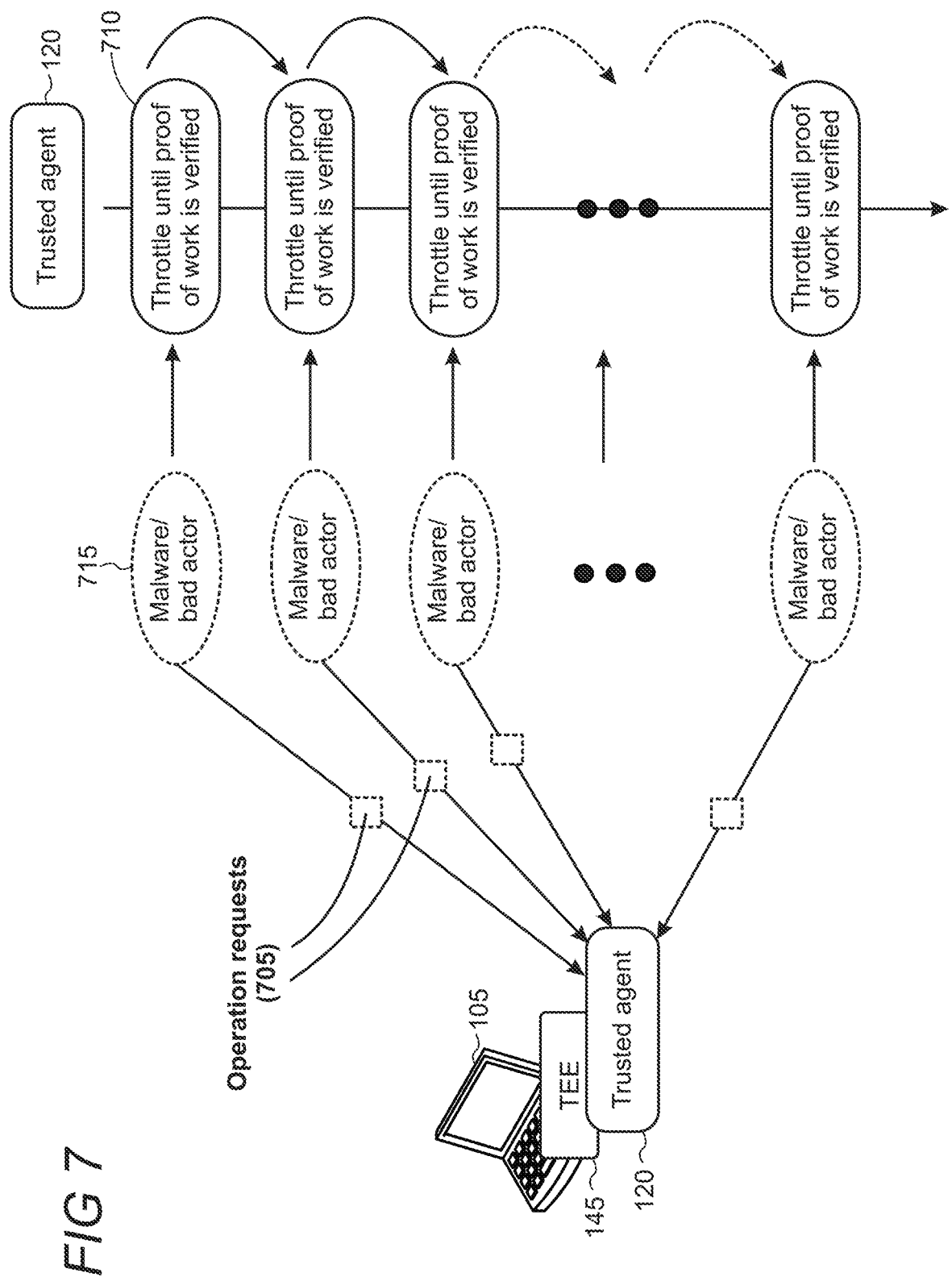
FIG. 7 shows an illustrative environment in which operation requests are throttled until proof of work for a puzzle is verified.

FIG. 7 shows an illustrative environment in which operation requests 705 are throttled until proof of work is verified by the trusted agent 120. In this example, the operation requests are initiated by malware or a bad actor 715 that may be attempting to persistently utilize the trusted agent's resources or operations. Scenarios in which the trusted agent provides authorization tokens for logon or attestation processes may enable the malware or bad actor to persistently retrieve authorization tokens, execute unauthorized uses, or pass uses along to third parties. As shown in FIG. 7, each instance of an operation request is throttled until the proof of work is verified 710 by the trusted agent. The trusted agent is configured to perform a single operation upon verification of the proof of work for a single puzzle. Each puzzle is solved consecutively such that subsequent puzzles are not transmitted by the trusted agent or solved until a pending puzzle is solved and verified by the trusted agent. While multiple operation requests can be submitted to and be pending at the trusted agent, the trusted agent outsources a single puzzle at a time.

Outsourcing the computational puzzles to a remote service enables the client computing device 105 to save resources within its resource constrained environment. For example, the processors and allocated memory at the TEE and the client computing device in general may be limited. Outsourcing the computational puzzles to a remote service enables the client computing device to save resources while simultaneously increasing security and throttling operation usage. The client computing device can save processor usage and memory by not having to perform the computations locally and not storing records of previous puzzles. Storing prior records of puzzle resolution is unnecessary since the policy dictates the time period over which puzzles are solved.

Figure 8:
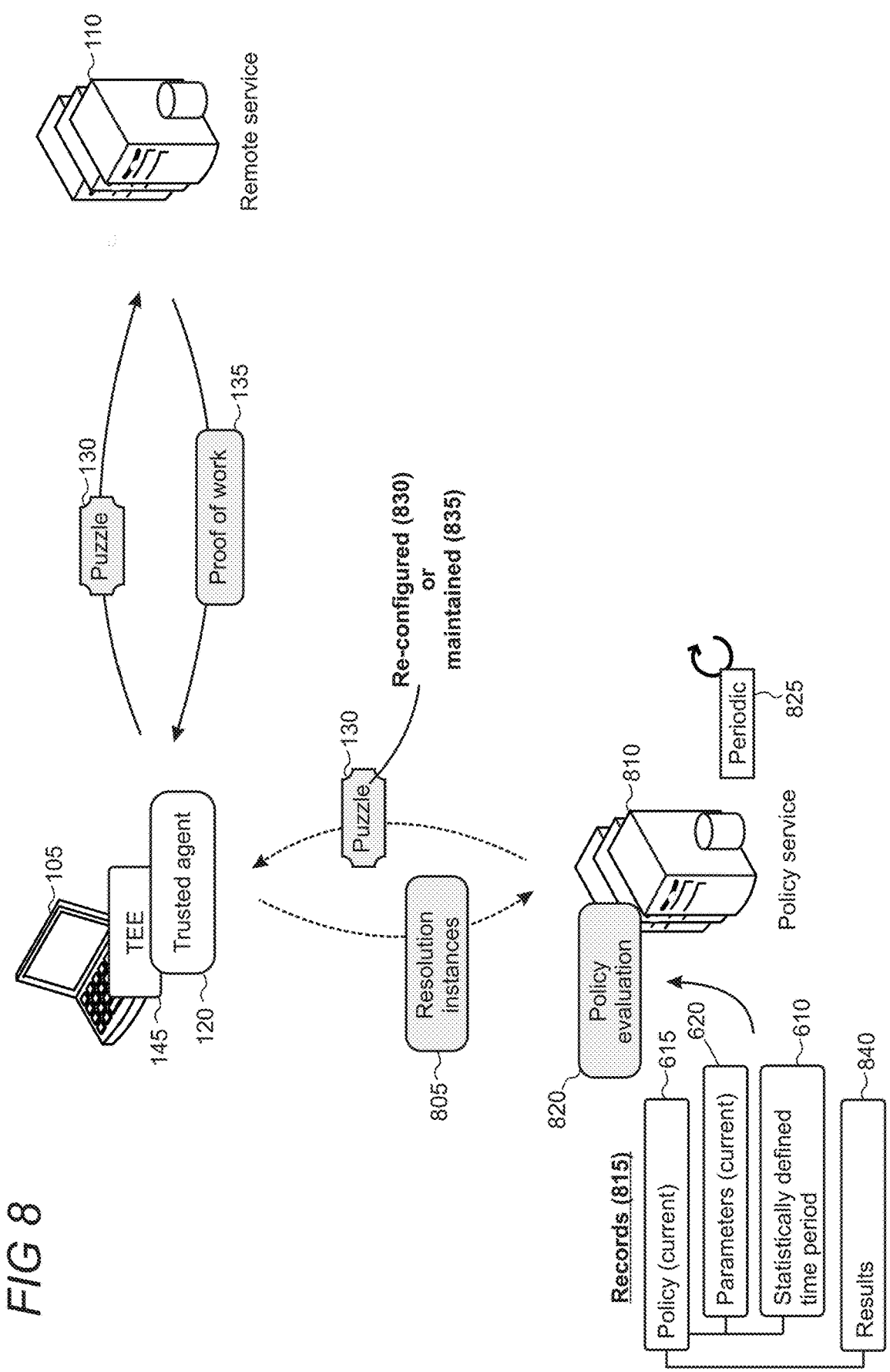
FIG. 8 shows an illustrative environment in which puzzles are periodically evaluated.

FIG. 8 shows an illustrative environment in which puzzle resolution instances 805 are evaluated by a remote policy service 810. The policy service may maintain records 815 of the trusted agent's policy 615 and the policy's associated parameters 620 and statistically defined time period 610, and may likewise periodically receive the results 840 for puzzle resolutions. Results can include the duration of time that the remote service takes to solve respective puzzles.

The policy service can perform a policy evaluation 820 on the records to determine whether the results satisfy or are within a threshold limit to the current policy. Satisfaction of the policy may occur when the results are within the statistically defined time period or are within a set threshold with upper and lower boundaries for the statistically defined time period. The policy service may re-configure the parameters for the puzzle if the results do not comport with the current policy. The policy service may increase or decrease the complexity of the puzzle by adjusting the parameters for the puzzle (FIG. 6). The policy service may transmit the puzzle 130 back to the trusted agent 120 after evaluation of the puzzle is complete, in which the transmitted puzzle may be re-configured 830 or maintained 835 depending on the outcome of the evaluation. The policy evaluation processes may occur periodically as illustratively shown by numeral 825, such as daily, weekly, upon the detection of an issue, or other metric.

Figure 9:
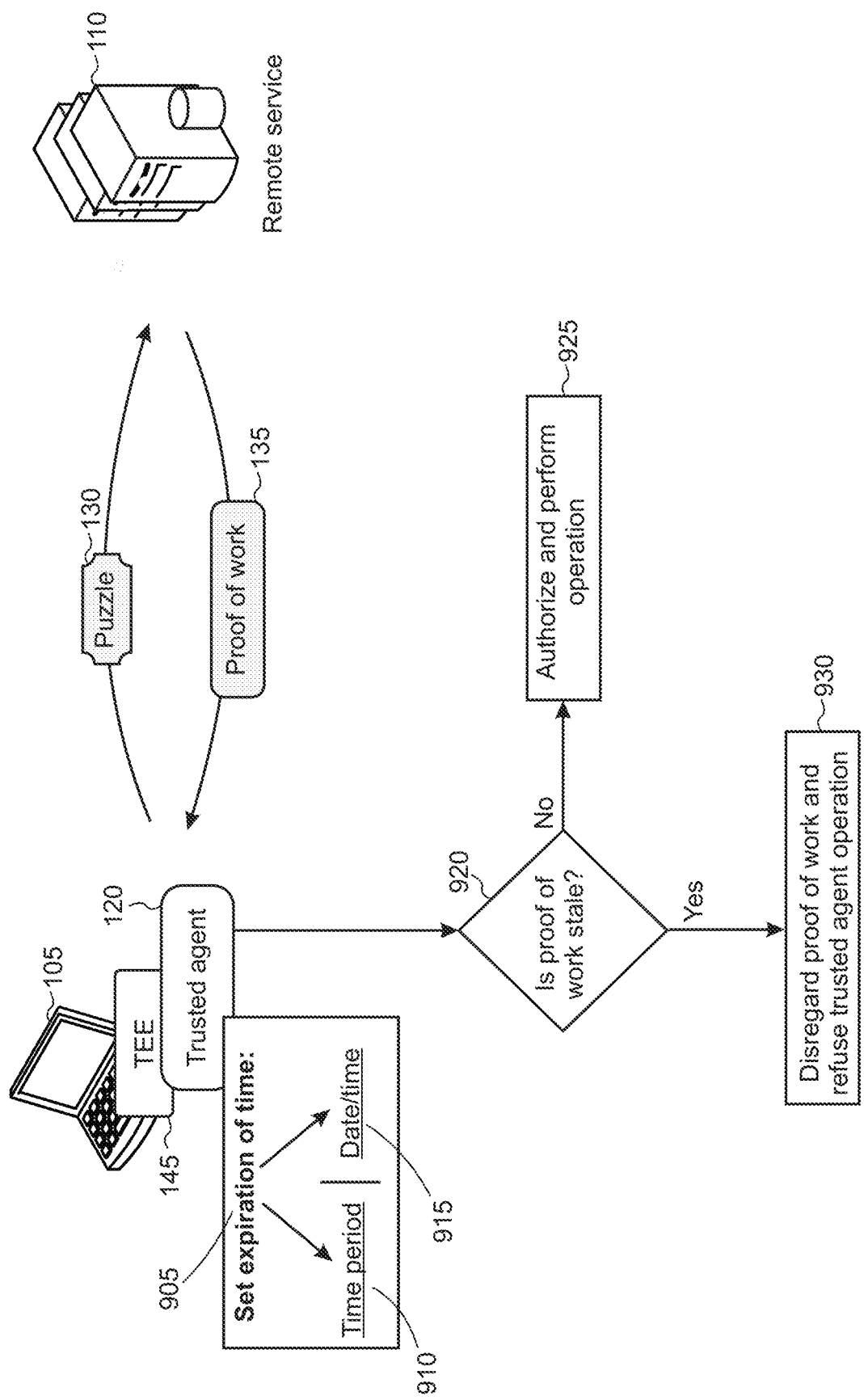
FIG. 9 shows an illustrative environment in which the client computing device determines whether a proof of work is stale.

FIG. 9 shows an illustrative diagram in which the trusted agent 120 sets an expiration of time by which to determine whether a received proof of work 135 is stale. The expiration of time can be set 905 according to a time period (e.g., 20 minutes, 24 hours, one week, etc.) 910 or a date/time (e.g., Apr. 5, 2019 at 12:00 p.m.) 915. Using the set expiration of time, the trusted agent can determine whether the received proof of work is stale, as shown at decision block 920. If the proof of work is received before the set expiration of time, then the trusted agent authorizes and performs the operation as shown in block 925. If the proof of work is stale for being received after the set expiration of time, then the trusted agent may disregard the proof of work and refuse performance of the operation, as shown in block 930.

Figure 10:
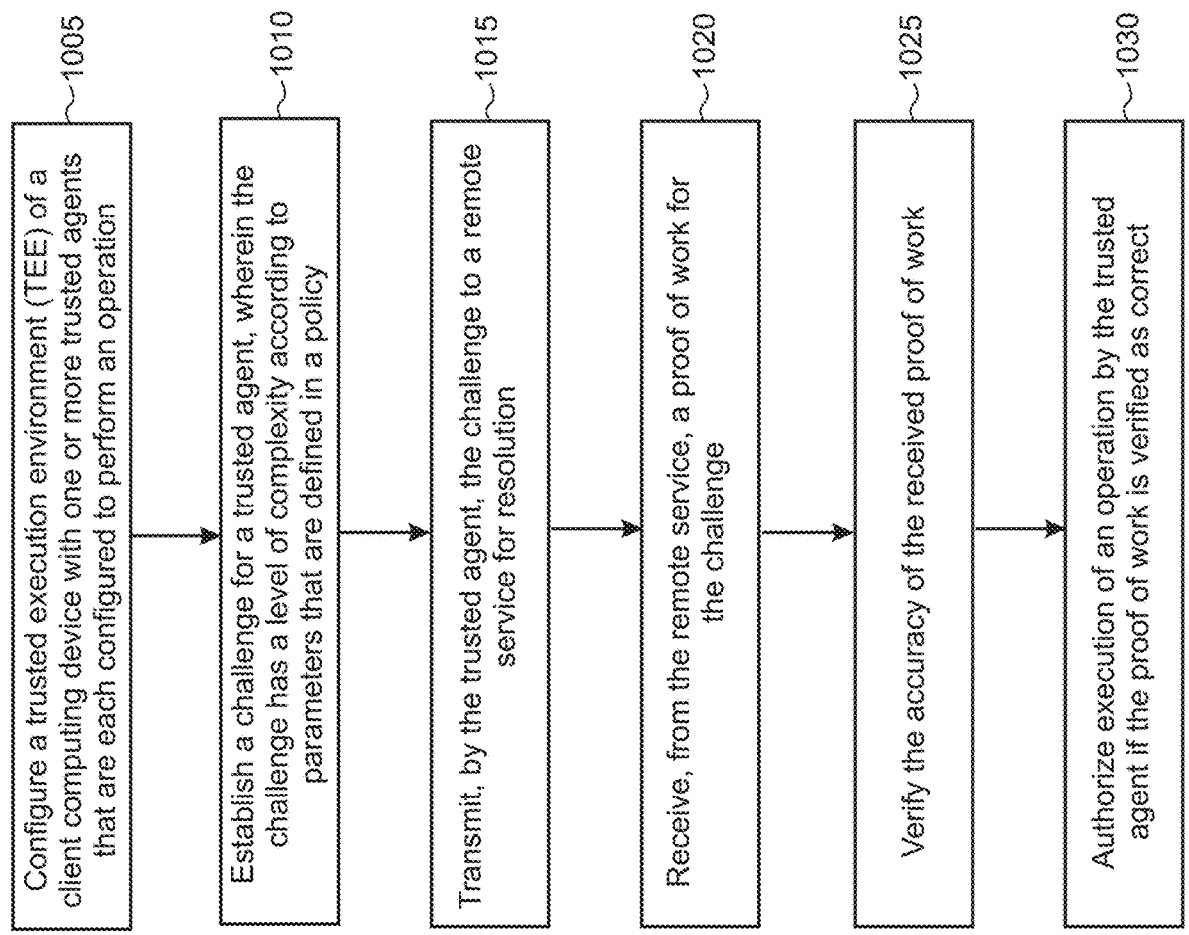
FIGS. 10-12 show flowcharts of illustrative methods performed by one or both of the client computing device and a remote service.
Figure 11:
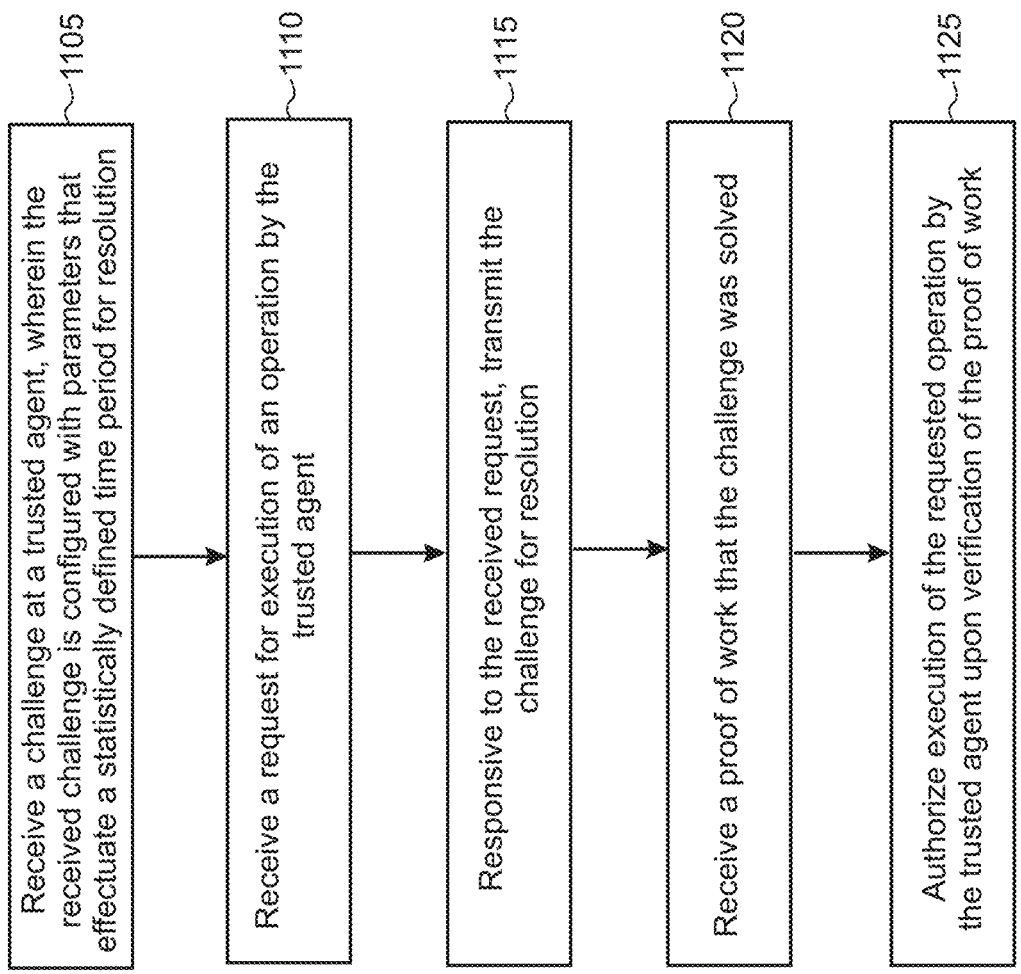
Figure 12:
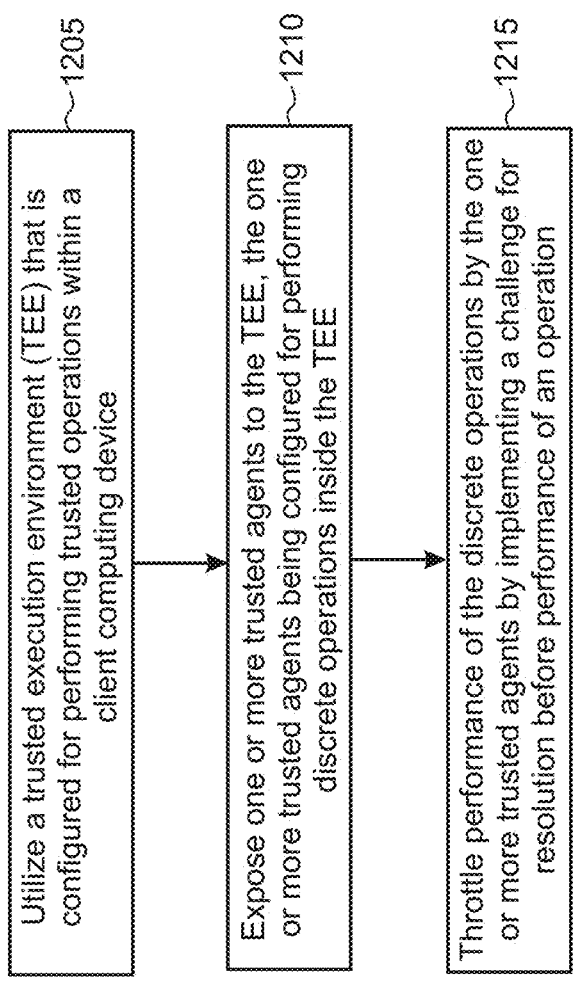

FIGS. 10-12 show flowcharts of illustrative methods which may be implemented by one or both of the client computing device or remote service. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 10 is a flowchart of an illustrative method 1000 performed by the client computing device. In step 1005, the client computing device configures a trusted execution environment (TEE) with one or more trusted agents that are each configured to perform an operation. In step 1010, the client computing device establishes a challenge for a trusted agent, wherein the challenge has a level of complexity according to parameters that are defined in a policy associated with the policy. In step 1015, the trusted agent transmits the challenge to a remote service for resolution. In step 1020, the trusted agent receives a proof of work for the challenge from the remote service. In step 1025, the client computing device verifies the accuracy of the received proof of work. In step 1030, the trusted agent authorizes execution of an operation if the proof of work is verified as correct.

FIG. 11 is a flowchart of an illustrative method 1100 performed by the client computing device. In step 1105, the client computing device receives a challenge at a trusted agent, wherein the received challenge is configured with parameters that effectuate a statistically defined time period for challenge resolution. In step 1110, the client computing device receives a request for execution of an operation by the trusted agent. In step 1115, responsive to the received request, the trusted agent transmits the challenge for resolution. In step 1120, the trusted agent receives a proof of work that the challenge was solved. In step 1125, the execution of the requested operation by the trusted agent is authorized upon verification of the proof of work.

FIG. 12 is a flowchart of an illustrative method 1200 performed by the client computing device. In step 1205, the client computing device utilizes a TEE that is configured for performing trusted operations within the client computing device. In step 1210, one or more trusted agents are exposed to the TEE. The one or more trusted agents are configured for performing discrete operations inside the TEE. In step 1215, the performance of the discrete operations by the one or more trusted agents is throttled by implementing a challenge for resolution before performance of the operation.

Figure 13:
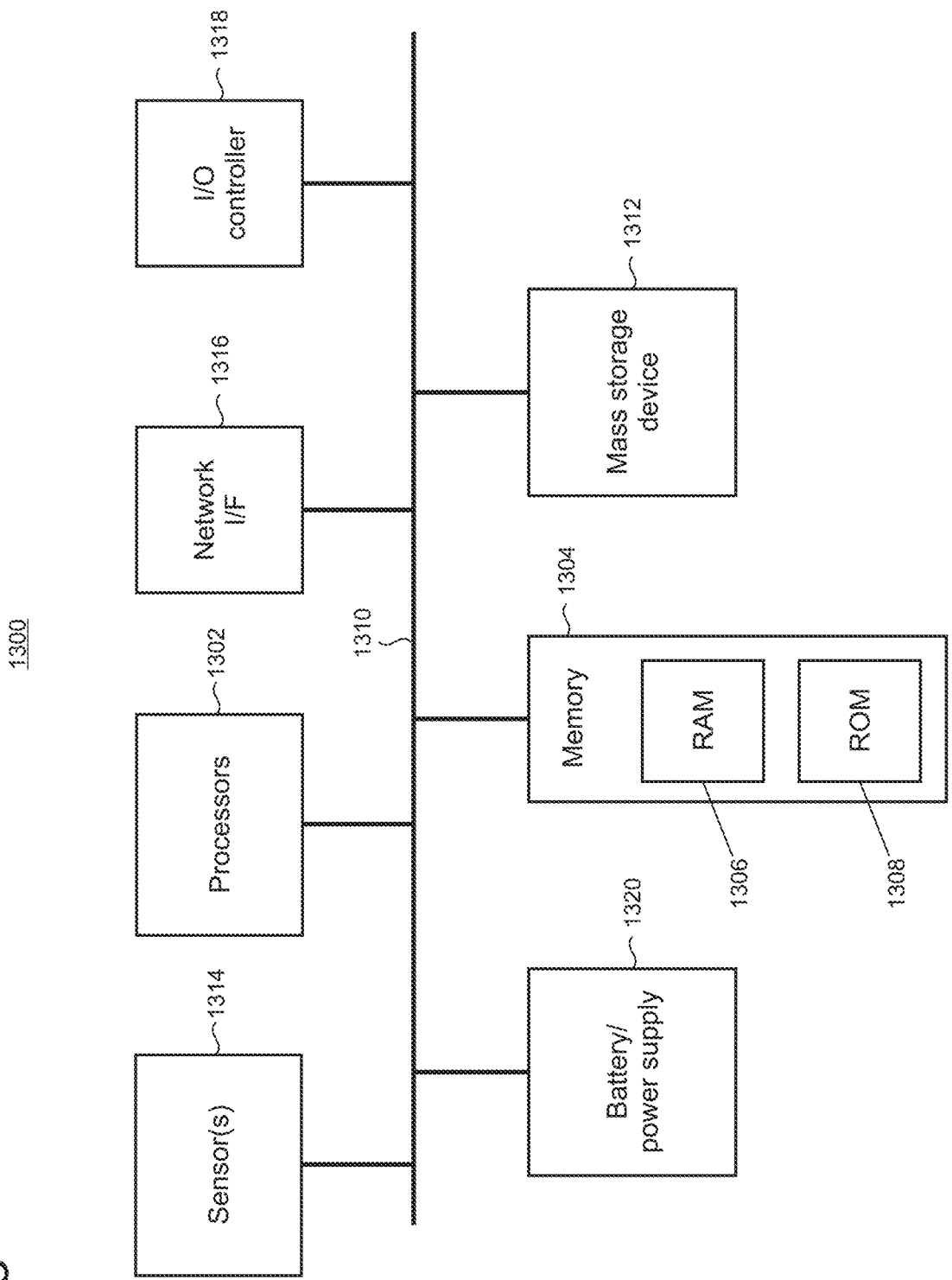
FIG. 13 is a simplified block diagram of an illustrative client computing device that may be used at least in part to implement the present measured execution of trusted agents in a resource constrained environment with proof of work.

FIG. 13 shows an illustrative architecture 1300 for a client computing device such as a laptop computer or personal computer for the present measured execution of trusted agents in a resource constrained environment with proof of work. The architecture 1300 illustrated in FIG. 13 includes one or more processors 1302 (e.g., central processing unit, dedicated Artificial Intelligence chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray, or other optical storage, magnetic cassette, magnetic tape, magnetic disk storage or other magnetic storage device, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1300 may further include one or more sensors 1314 or a battery or power supply 1320. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
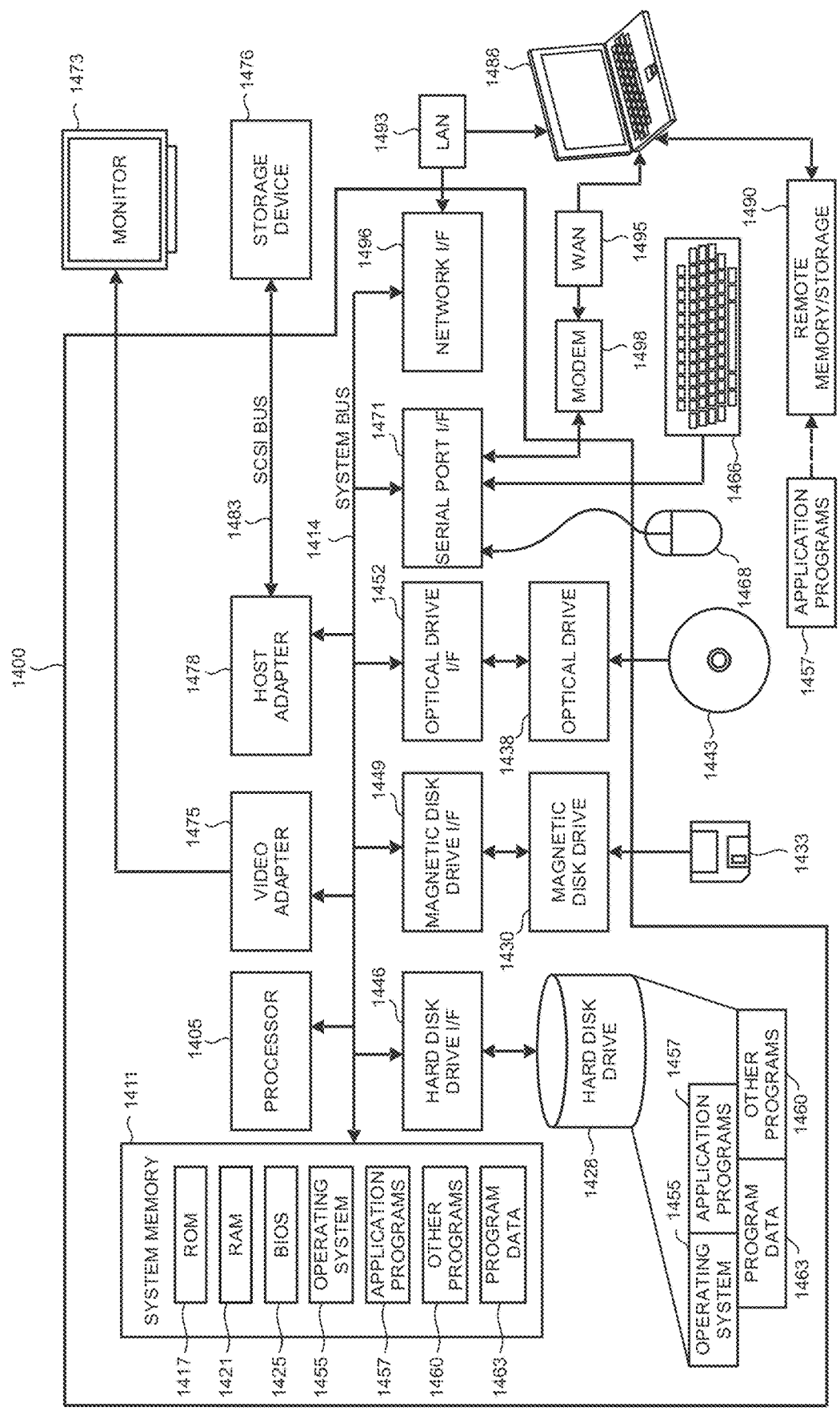
FIG. 14 is a simplified block diagram of an illustrative remote server or computer system that may be used in part to implement the present measured execution of trusted agents in a resource constrained environment with proof of work.

FIG. 14 is a simplified block diagram of an illustrative computer system 1400 such as a PC or server with which the present measured execution of trusted agents in a resource constrained environment with proof of work may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present measured execution of trusted agents in a resource constrained environment with proof of work. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present measured execution of trusted agents in a resource constrained environment with proof of work.

Various exemplary embodiments of the present measured execution of trusted agents in a resource constrained environment with proof of work are now presented by way of illustration and not as an exhaustive list of all embodiments. An example includes a method performed by a client computing device to measure and regulate execution of trusted agents, comprising: configuring a trusted execution environment (TEE) of the client computing device with one or more trusted agents that are each configured to perform an operation; establishing a challenge for a trusted agent, wherein the challenge has a level of complexity according to parameters that are configured to effectuate a statistically defined time period for solving the challenge, and wherein the parameters are defined in a policy associated with the challenge; transmitting, by the trusted agent, the challenge to a remote service for resolution; receiving, from the remote service, a proof of work for the challenge; verifying the accuracy of the received proof of work; and authorizing execution of an operation by the trusted agent if the proof of work is verified as correct.

In another example, the trusted agent provides an authorization or a logon token for a user to access an account or services upon verification of the proof of work. In another example, the challenge is hash function. In another example, a challenge's parameters for each trusted agent is unique according to the respective trusted agents' statistically defined time period contained within a policy. In another example, the client computing device is further configured with a rich execution environment (REE) and operations inside the TEE are bifurcated from the REE. In another example, the method further comprises determining whether the received proof of work is stale and disregarding the proof of work when the proof of work is stale. In another example, the proof of work is stale when it is not received by a set date and time or it is received after expiration of a time period. In another example, the parameters for the challenge are re-configured when results indicate that the challenge is solved outside of the statistically defined time period. In another example, the method further comprises receiving multiple requests for the trusted agent to perform operations and performing a single operation responsive to each proof of work verification.

A further example includes a client computing device configured with a rich execution environment (REE) and a trusted execution environment (TEE), comprising: one or more processors at least in part associated with the TEE; and one or more hardware-based memory devices at least in part associated with the TEE and which store computer-readable instructions which, when executed by the one or more processors, cause the client computing device to: receive a challenge at a trusted agent operating within the TEE, wherein the received challenge is configured with parameters that effectuate a statistically defined time period for the challenge to be solved; receive a request for execution of an operation by the trusted agent; responsive to the received request, transmit the challenge for resolution; receive a proof of work that the challenge was solved; and authorize execution of the requested operation by the trusted agent upon verification of the proof of work.

In another example, a remote policy service evaluates instances in which challenges for the trusted agent are solved, and responsive to the evaluation the parameters for the challenge are either maintained or re-configured. In another example, the instances are evaluated periodically. In another example, the parameters are maintained if instances of challenge resolutions indicate the challenges are solved according to the statistically defined time period defined by a policy associated with the challenge. In another example, the parameters are re-configured if instances of challenge resolutions indicate the challenges are solved outside of the statistically defined time period defined by a policy associated with the challenge. In another example, malware is at least indirectly exposed to the trusted agent within the TEE and effects of the malware are at least partially throttled by the statistically defined time period for solving the challenge. In another example, the trusted agent verifies that the proof of work is received within a set expiration of time before executing the operation.

A further example includes one or more hardware-based non-transitory computer-readable memory devices storing instructions which, when executed by one or more processors disposed in a client computing device, cause the client computing device to: utilize a trusted execution environment (TEE) that is configured for performing trusted operations, the TEE being separate from a rich execution environment associated with the client computing device; expose one or more trusted agents to the TEE, the one or more trusted agents being configured for performing discrete operations inside the TEE; and throttle performance of the discrete operations by the one or more trusted agents by implementing a challenge for resolution before a respective trusted agent performs an operation, in which each of the one or more trusted agents are associated with a unique challenge, wherein each challenge is associated with parameters that effectuate a statistically defined time period for challenge resolution.

In another example, the executed instructions further cause the client computing device to receive a proof of work at a trusted agent that indicates a challenge has been solved, determine the accuracy of the proof of work, and perform an operation when the proof of work is determined to be correct. In another example, the TEE is resource constrained relative to a rich execution environment of the client computing device. In another example, the discrete operations performed by the one or more trusted agents are to enable and facilitate access to information or resources.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a client computing device to measure and regulate execution of trusted agents, comprising:

configuring a trusted execution environment (TEE) of the client computing device with one or more trusted agents that are each configured to perform an operation;

associating a challenge with a trusted agent, wherein the challenge has a level of complexity according to parameters that are configured to effectuate a statistically defined time period for solving the challenge, and wherein the parameters are defined in a policy associated with the challenge;

transmitting, by the trusted agent, the challenge to a remote service to solve;

receiving, from the remote service, a solved challenge as a proof of work for the challenge;

verifying, by the trusted agent, that the received proof of work is correct; and authorizing execution of the operation by the trusted agent based on the verifying that the received proof of work is correct.

2. The method of claim 1, in which the trusted agent provides an authorization or a logon token for a user to access an account or services upon verification of the proof of work.

3. The method of claim 1, in which the challenge is a hash function.

4. The method of claim 1, in which a challenge's parameters for each trusted agent is unique according to the respective trusted agents' statistically defined time period contained within a policy.

5. The method of claim 1, in which the client computing device is further configured with a rich execution environment (REE) and operations inside the TEE are bifurcated from the REE.

6. The method of claim 1, further comprising:

determining whether the received proof of work is stale; and disregarding the proof of work when the proof of work is stale.

7. The method of claim 6, in which the proof of work is stale when it is not received by a set date and time or it is received after expiration of a time period.

8. The method of claim 1, in which the parameters for the challenge are re-configured when results indicate that the challenge is solved outside of the statistically defined time period.

9. The method of claim 8, further comprising:

receiving multiple requests for the trusted agent to perform operations; and performing a single operation responsive to each proof of work verification.

10. A client computing device configured with a rich execution environment (REE) and a trusted execution environment (TEE), comprising:

one or more processors at least in part associated with the TEE; and one or more hardware-based memory devices at least in part associated with the TEE and which store computer-readable instructions which, when executed by the one or more processors, cause the client computing device to:

receive a challenge at a trusted agent operating within the TEE, wherein the received challenge is configured with parameters that effectuate a statistically defined time period for the challenge to be solved;

receive a request for execution of an operation by the trusted agent;

responsive to the received request, transmit the challenge to a remote service to solve;

receive from the remote service a solved challenge as a proof of work for the challenge;

verify, by the trusted agent, that the received proof of work is correct; and authorize execution of the requested operation by the trusted agent, based on the verifying, that the received proof of work is correct.

11. The client computing device of claim 10, wherein the remote service evaluates instances in which challenges for the trusted agent are solved, and responsive to the evaluation, the parameters for the challenge are either maintained or re-configured.

12. The client computing device of claim 11, in which the instances are evaluated periodically.

13. The client computing device of claim 11, in which the parameters are maintained if instances of challenge resolutions indicate the challenges are solved according to the statistically defined time period defined by a policy associated with the challenge.

14. The client computing device of claim 11, in which the parameters are re-configured if instances of challenge resolutions indicate the challenges are solved outside of the statistically defined time period defined by a policy associated with the challenge.

15. The client computing device of claim 10, in which malware is at least indirectly exposed to the trusted agent within the TEE and effects of the malware are at least partially throttled by the statistically defined time period for solving the challenge.

16. The client computing device of claim 10, in which the trusted agent verifies that the proof of work is received within a set expiration of time before executing the operation.

17. One or more hardware-based non-transitory computer-readable memory devices storing instructions which, when executed by one or more processors disposed in a client computing device, cause the client computing device to:

utilize a trusted execution environment (TEE) that is configured for performing trusted operations on the client computing device, the TEE being separate from a rich execution environment associated with the client computing device;

expose one or more trusted agents to the TEE, the one or more trusted agents being configured for performing respective discrete operations inside the TEE;

implement a challenge to be solved as a condition for a respective trusted agent to perform a respective discrete operation, in which each of the one or more trusted agents is associated with a unique challenge, wherein each challenge is associated with parameters that effectuate a statistically defined time period for each challenge to be solved;

transmit a challenge to a remote service to solve;

receive from the remote service a solved challenge as a proof of work for the challenge;

verify, by a trusted agent that is respectively associated with the transmitted challenge, that the received proof of work is correct; and authorize execution of the discrete operation by the respective trusted agent that the received proof of work is correct.

18. The one or more hardware-based non-transitory computer-readable memory devices of claim 17, in which the TEE is resource constrained relative to the rich execution environment of the client computing device.

19. The one or more hardware-based non-transitory computer-readable memory devices of claim 18, in which the discrete operations performed by the one or more trusted agents are to enable and facilitate access to information or resources.

* * * * *